(12) United States Patent
Horner et al.

(10) Patent No.: US 11,962,179 B2
(45) Date of Patent: Apr. 16, 2024

(54) CONTROL OF A DISPLAY PANEL OF A BARCODE READER TO INDICATE A BATTERY LEVEL

(71) Applicant: ZEBRA TECHNOLOGIES CORPORATION, Lincolnshire, IL (US)

(72) Inventors: Matthew Lawrence Horner, Sound Beach, NY (US); Pavithra Eswaran, Plainview, NY (US); Manjunath Joshi, Uttarahalli (IN)

(73) Assignee: Zebra Technologies Corporation, Lincolnshire, IL (US)

(*) Notice: Subject to any disclaimer, the term of this patent is extended or adjusted under 35 U.S.C. 154(b) by 184 days.

(21) Appl. No.: 17/354,051

(22) Filed: Jun. 22, 2021

(65) Prior Publication Data

US 2022/0407323 A1   Dec. 22, 2022

(51) Int. Cl.
*H01M 10/46* (2006.01)
*G06K 7/14* (2006.01)
*H02J 7/00* (2006.01)

(52) U.S. Cl.
CPC .......... *H02J 7/0048* (2020.01); *G06K 7/1413* (2013.01); *H02J 7/0013* (2013.01); *H02J 7/0044* (2013.01)

(58) Field of Classification Search
CPC ...... H02J 7/0013; H02J 7/0044; H02J 7/0048; H02J 7/1413; G06K 7/1413
USPC ................................. 320/114, 132, 149, 116
See application file for complete search history.

(56) References Cited

U.S. PATENT DOCUMENTS

| | | | |
|---|---|---|---|
| 2016/0172879 A1* | 6/2016 | Valentine | ............ H04W 52/027 320/136 |
| 2018/0351373 A1* | 12/2018 | Behzadi | ................ H02J 7/0049 |
| 2019/0207400 A1* | 7/2019 | Colavito | .............. G08B 21/182 |

FOREIGN PATENT DOCUMENTS

CA         2201374 A1 *  4/1986

* cited by examiner

*Primary Examiner* — Edward Tso

(57) ABSTRACT

A controller of a barcode reader is disclosed. The controller may receive, via a user input, a charge threshold associated with presenting a battery level indicator on the display panel. The controller may monitor, during a charging operation, a state of charge of the battery. The controller may determine that the state of charge satisfies the charge threshold. The controller may cause, during the charging operation, the display panel to indicate the battery level indicator.

20 Claims, 5 Drawing Sheets

CONTROL OF A DISPLAY PANEL OF A BARCODE READER TO INDICATE A BATTERY LEVEL

BACKGROUND

A barcode reader may include a rechargeable battery or other type of rechargeable power source. Accordingly, the battery may be charged, via a charge operation involving a charging station, prior to use by a user. Displaying the battery level indicator during the charge operation may unnecessarily waste power. Accordingly, there is a need for the barcode reader to indicate that the battery is sufficiently charged for use without consuming unnecessary power resources.

SUMMARY

In some implementations, a method for controlling a display panel of a barcode reader includes receiving, via a user input, a charge threshold associated with presenting a battery level indicator on the display panel; monitoring, during a charging operation, a state of charge of the battery; determining that the state of charge satisfies the charge threshold; and causing, during the charging operation, the display panel to indicate the battery level indicator.

In some implementations, a barcode reader includes a display panel and a controller configured to: receive, during a charging operation and from a battery interface of a battery, a measurement of a state of charge of the battery; determine that the measurement indicates that the state of charge satisfies a charge threshold, wherein the charge threshold was set according to a user input; and enable, during the charging operation and based on determining that the state of charge satisfies the charge threshold, the battery to supply power to the display panel; and cause the display panel to present a battery level indicator associated with the state of charge.

In some implementations, a system may include a battery pack, a charge station, and a barcode reader configured to: set a configurable charge threshold for presenting, during one or more charge operations, a battery level indicator, on a display panel of the barcode reader, wherein the battery level indicator is associated with a state of charge of a battery of the battery pack; detecting a charging operation involving the battery and the charging station; determine, during the charging operation, that the state of charge satisfies the configurable charge threshold; and cause, based on the state of charge satisfying the configurable charge threshold, the display panel to present the battery level indicator.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
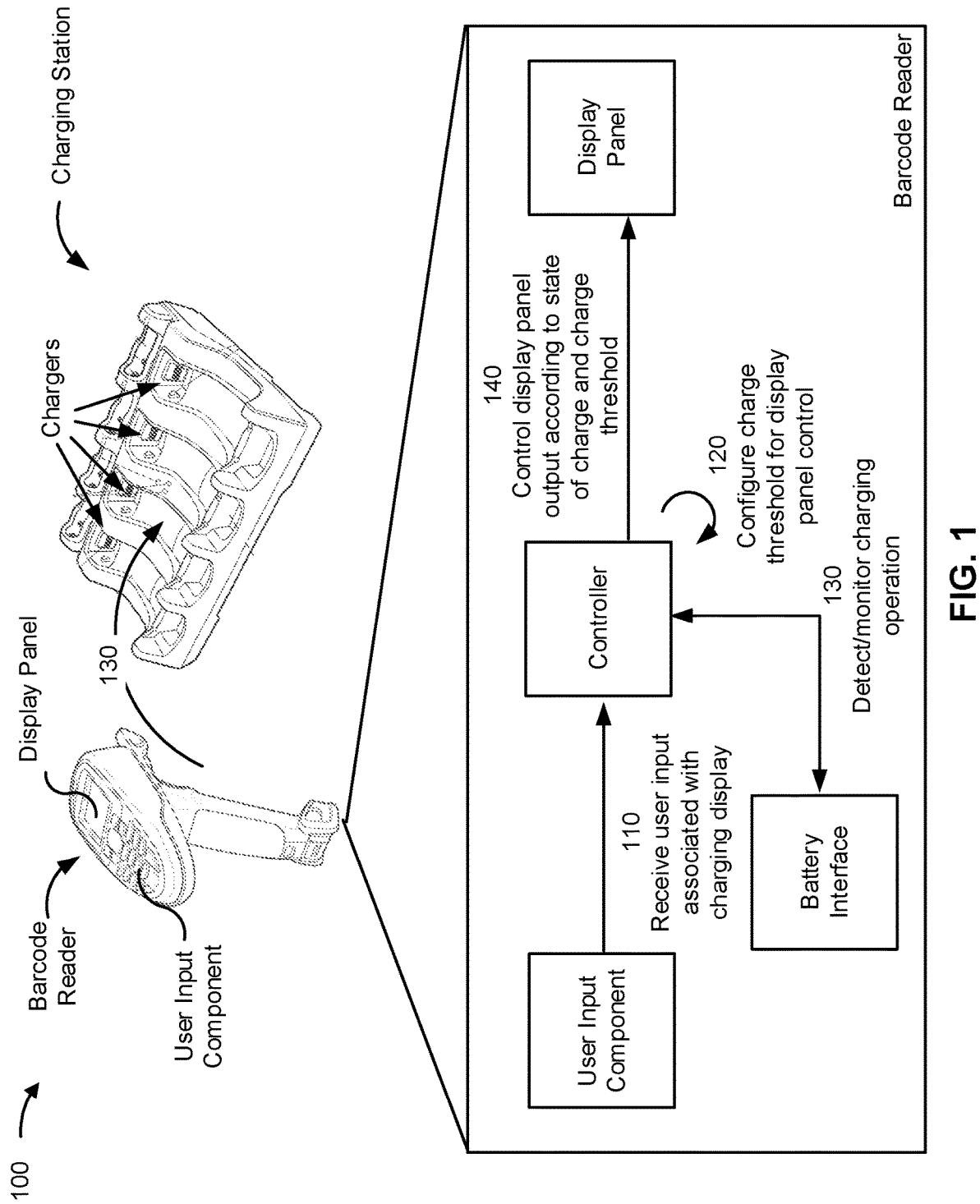
FIG. 1 is a diagram of an example implementation associated with controlling a display panel of a barcode reader to indicate a battery level, as described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

A barcode reader is typically used by individuals (e.g., employees) in the course of handling or managing items (e.g., products) that are associated with a barcode. An individual, prior to using the barcode reader, may retrieve the barcode reader from a charging station while the barcode reader is undergoing a charging operation and/or after a charging operation of the barcode reader has completed. To avoid having an individual select or use a barcode reader with a relatively low amount of power stored in a battery of a battery pack of the barcode reader (which may involve the individual having to select another barcode reader and/or return to the charging station to select another barcode reader after the battery is out of power), the barcode reader may indicate, via a display panel of the barcode reader, a battery level indicator that indicates a battery level or state of charge of the battery. Accordingly, the individual may detect, based on displayed battery level indicators, which barcode reader is ready for use.

However, displaying the battery level indicator via the display panel may unnecessarily consume power resources. For example, if a battery level of a battery is not sufficient for the user to use the barcode reader over the course of the user's shift, displaying such a battery level may waste power resources.

Some implementations described herein provide a barcode reader that displays a battery level indicator according to a user configurable charge threshold that permits a user to recognize when the barcode reader is ready for use and that reduces consumption of unnecessary power resources when the barcode reader is not ready for use (according to the configured charge threshold). For example, the barcode reader may receive, from a user and via a user input component, a charge threshold that is to trigger the barcode reader to cause a display panel of the barcode reader to display a battery level indicator. In some implementations, the battery level indicator, when displayed in a location on the display panel, may be moved to one or more different locations on the display panel by a controller of the barcode reader, to extend a useful life of the display panel and prevent damage to pixels of the display panel (which may be referred to as "burn-in").

FIG. 1 is a diagram of an example implementation 100 associated with controlling a display panel of a barcode reader to indicate a battery level. As shown in FIG. 1, example implementation 100 includes a barcode reader with a battery pack and a charging station. The barcode reader, as shown, may include a controller, a user input component, a battery interface, and a display panel. The charging station may include one or more chargers that are configured to charge individual battery packs of barcode readers.

As shown in FIG. 1, and by reference number 110, the controller receives, from a user input component, a user input associated with a charging display for the display panel. The charging display may correspond to content that is to be displayed on the display panel during a charging operation involving the battery pack. The user input may indicate a charge threshold associated with presenting a battery level indicator on the display panel. The charge threshold may be configurable via the user input.

The user input may be received as an input to a menu associated with a settings interface or a preferences interface of the barcode reader. For example, the user may enter a specific battery level (e.g., as a percentage of a maximum charge capacity of the battery and/or as a minimum amount of power stored in the battery) as a charge capacity threshold. Additionally, or alternatively, the user input may be received based on a scan of a barcode (e.g., a barcode that is configured to set the charge threshold). In some implementations, a configuration file may be included within the user input and/or in association with the user input to configure the charge threshold of the barcode reader, as described herein.

In some implementations, a user may select the charge threshold from a plurality of selectable charge thresholds that are selectable via one or more corresponding user inputs associated with the menu. The individual selectable charge thresholds may be associated with mutually exclusive charge capacity ranges of the battery. For example, a charge threshold may be a minimum of one charge capacity range and another one of the selectable thresholds may be greater than or equal to a maximum of the charge capacity range. As another example, a selectable charge threshold may be a minimum (e.g., 50% of the maximum charge capacity) of an intermediate charge capacity range (e.g., from 50% to 75% of the maximum battery capacity). In such an example, another selectable charge threshold may be a minimum (e.g., 75% of the maximum charge capacity) of a higher charge capacity range (e.g., from 75% to 90% of the maximum charge capacity or higher).

As further shown in FIG. 1, and by reference number 120, the barcode reader, via the controller, may configure the charge threshold for displaying the battery level indicator. For example, the controller may set a charge threshold, as indicated by the user input. In this way, the controller, during a charge operation (e.g., a next charge operation that is detected, or subsequent charge operations that are detected), can control the display panel to display a battery level indicator based on the set charge threshold and a state of charge of the battery during the charge operation.

In some implementations, when configuring the charge threshold according to the user input, the controller may adjust the charge threshold from a default threshold value (e.g., a charge threshold that is designated by a manufacturer of the barcode reader). Additionally, or alternatively, controller may adjust the charge threshold to be a new charge threshold identified by the user input that is different from a previous charge threshold that was selected (or configured) via a previously received user input.

As further shown in FIG. 1, and by reference number 130, the barcode reader may detect and/or monitor a charging operation involving the battery pack. For example, the controller, via information from the battery interface (e.g., information indicating that power is being supplied to a battery of the battery pack), may determine that a charging operation is being performed. Additionally, or alternatively, the barcode reader may detect the charging operation based on detecting that a terminal of the battery is in contact with the charging station (e.g., via one or more sensors of the barcode reader, such as voltage sensors, contact sensors, proximity sensors, or the like).

In some implementations, the battery is a replaceable battery that is configured to be received by the barcode reader. In such cases, the state of charge of the battery may be received from a battery manager of the replaceable battery (and/or the battery pack) that provides the state of charge to the barcode reader via the battery interface. In this way, the barcode reader may be interoperable with multiple batteries and/or control the display panel to display a battery level indicator, as described herein, regardless of whether a particular battery pack is installed on or has been received by the barcode reader.

Based on detecting the charging operation, the barcode reader may monitor a state of charge of the battery. The state of charge of the battery may correspond to information associated with the charging operation. The battery level indicator may be associated with a state of charge of a battery of the battery pack. For example, the state of charge may indicate a battery level of the battery from the battery pack. Additionally, or alternatively, the state of charge may indicate a charge count corresponding to an amount of power supplied to the battery during the charging operation. In some implementations, the state of charge may indicate a duration of the charging operation and/or an amount of time remaining until the battery is charged. Accordingly, the barcode reader, via the controller, may compare the state of charge with a charge threshold (e.g., by comparing a battery level with a battery level associated with the charge threshold, or comparing an amount of received power during the charge operation with an amount of power associated with the charge threshold).

The barcode reader may monitor the state of charge, during the charge operation, based on receiving measurements associated with the state of charge from the battery interface associated with the battery. Accordingly, one or more of the received measurements may be compared with the charge threshold to permit the barcode reader and/or the controller to determine whether the battery level indicator is to be presented via the display panel, as described elsewhere herein.

As further shown in FIG. 1, and by reference number 140, the barcode reader outputs the battery level indicator according to the state of charge and the charge threshold. For example, the controller may determine, during the charging operation, that the state of charge satisfies the charge threshold, and cause the display panel to present the battery level indicator. The battery level indicator may indicate the state of charge when presented via the display panel (e.g., the battery level indicator may be indicative of a value that is indicative of the state of charge). Additionally, or alternatively, the battery level indicator may indicate that the state of charge satisfies the charge threshold (e.g., as a binary output).

In some implementations, the barcode reader may perform one or more actions to prevent damage to the display panel caused by burn-in. For example, during the charge operation and while presenting the battery level indicator, the controller may cause the display panel to adjust content output from the display panel to prevent pixels experiencing burn-in. More specifically, the controller may cause the display panel to adjust a pixel location associated with battery level indicator. In some implementations, the barcode reader (or controller) may move, during a charging operation, the pixel location of the battery level indicator on the display panel according to an adjustment schedule. The controller may utilize the adjustment schedule (which indicates times and corresponding locations associated with movement of the battery level indicator) that is configured to cause the battery level indicator to be indicated in various locations on the display panel (e.g., in a first location of the display panel during a first time period and a second location of the display panel during a second time period). In this way, the controller may cause the display panel to present, during a charging operation, the battery level indicator and/or vary a position of the battery level indicator according to an adjustment schedule to prevent burn-in or other potential damage to pixels of the display panel that would otherwise be caused by presenting the battery level indicator in a fixed position.

In some implementations, a charging operation may be overridden by one or more other operations of the barcode reader. For example, for an interaction involving a user interaction, such as a user interacting with the user input component, the barcode reader may override processes described herein for displaying the battery level indicator during the charging operation. Additionally, or alternatively, the user interaction may involve a user removing the barcode reader from the charger of the charging station, thereby ending the charging operation. In this way, the barcode reader may permit the display panel to display the battery level indicator based on a user interaction with the barcode reader. In some implementations, after the charging operation, the barcode reader may indicate the battery level indicator regardless of whether the battery level of the battery satisfies a charge threshold for displaying the battery level indicator during a charge operation, as described herein. In this way, the controller may control the display panel as described herein until the charging operation is over (e.g., until a terminal of the battery is not in contact with a charger of the charging station).

Accordingly, as described herein, the barcode reader (and/or a controller of the barcode reader) may cause, based on a state of charge of a battery satisfying a configurable charge threshold during a charge operation, a display panel to present a battery level indicator. Accordingly, a user of the barcode reader may recognize that the battery is ready for use based on the battery level indicator, and the barcode reader may avoid consuming power resources associated with the displaying the battery level indicator until the barcode reader is ready to use according to the configurable charge threshold.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
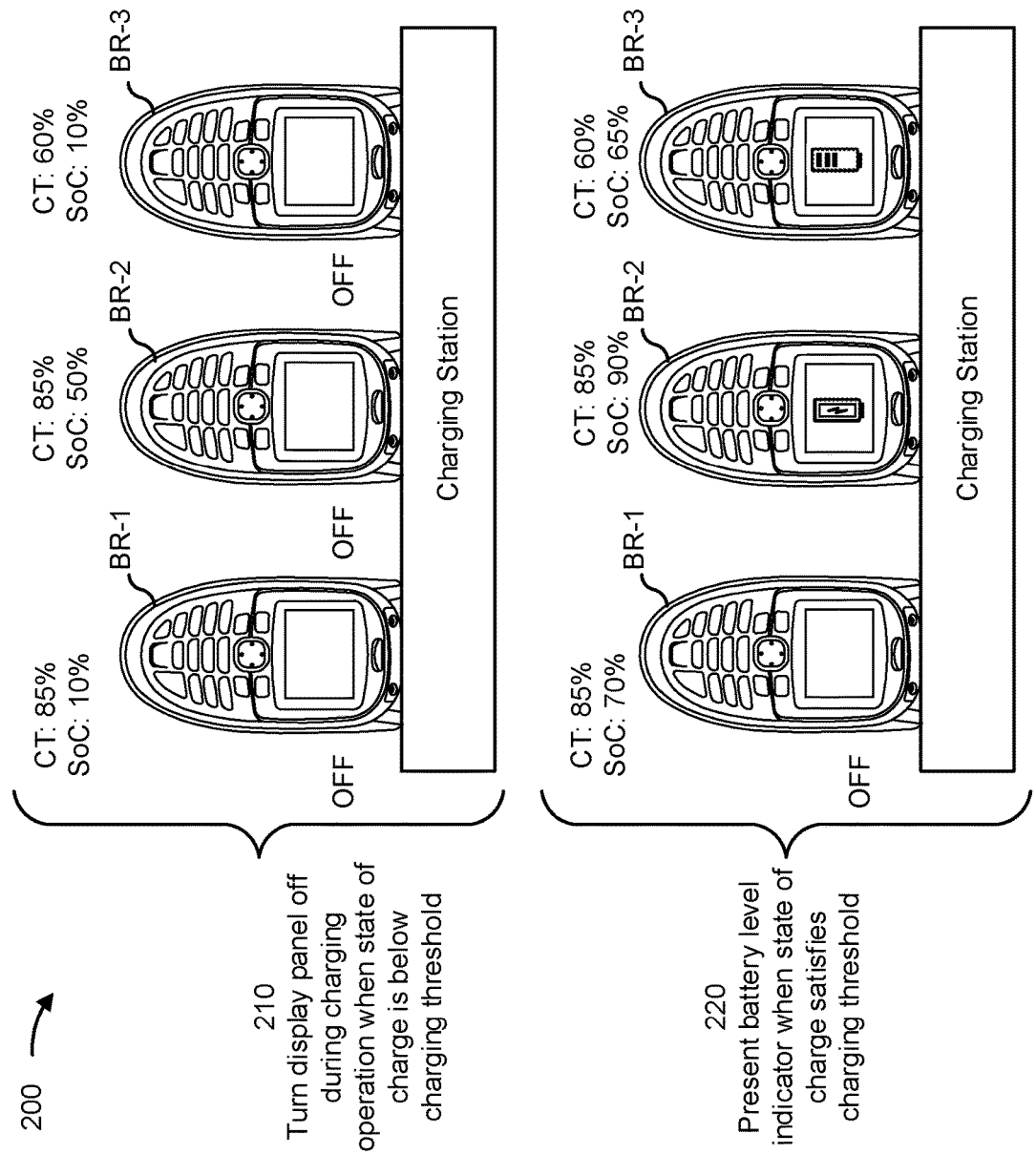
FIG. 2 is a diagram of an example implementation involving a charging station with multiple barcode readers, in accordance with examples described herein.

FIG. 2 is a diagram of an example implementation 200 involving a charging station with multiple barcode readers, in accordance with examples described herein. As shown in FIG. 2, example implementation 200 includes a first barcode reader (BR-1), a second barcode reader (BR-2), and a third barcode reader (BR-3) (referred to collectively as the "barcode readers") and a charging station that is charging the barcode readers.

As shown in FIG. 2, and by reference number 210, the barcode readers turn their respective display panels off during the charging operation when the state of charge is below the charging threshold. More specifically, the first barcode reader may turn off the display because the configurable charge threshold (CT) is set at 85% charge and the state of charge (SoC) is at 10% charge, the second reader may turn off the display because the charge threshold is also set to 85% charge and the state of charge is at 50%, and the third barcode reader may turn off the display because the charge threshold is set to 60% and the SoC is at 10%. Accordingly, for each of the barcode readers, because the states of charge are below the set charge thresholds, each of the barcode readers may turn off its display panel so that the display panel is prevented from presenting (or displaying) a battery level indicator (and/or the state of charge) during the charging operation (e.g., unless another operation of the barcode reader is initiated that overrides the charging operation).

As further shown in FIG. 2, and by reference number 220, the second barcode reader and the third barcode reader present their respective battery level indicators when the states of charge satisfy the corresponding thresholds. More specifically, the first barcode reader may not display the battery level indicator because the charge threshold is set at 85% charge and the state of charge is at 70% charge, the second reader may display the battery level indicator because the state of charge satisfies the charge threshold (the charge threshold is set to 85% charge and the state of charge is at 90%), and the third barcode reader may display a battery level indicator that indicates a range associated with the state of charge because the charge threshold is set to 60% and the state of charge is at 65%. The battery level indicator presented on the display panel of the second barcode reader may be a binary indicator that indicates that the battery has reached the charge threshold during a charging operation. The battery level indicator presented on the display panel of the third barcode reader may indicate a battery level according to a particular range (e.g., high, medium high, medium, medium low, and/or low).

In this way, various configurations and/or configurable charge thresholds may be set for displaying a battery level indicator for a barcode reader during a charge operation involving a battery pack of the barcode reader.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
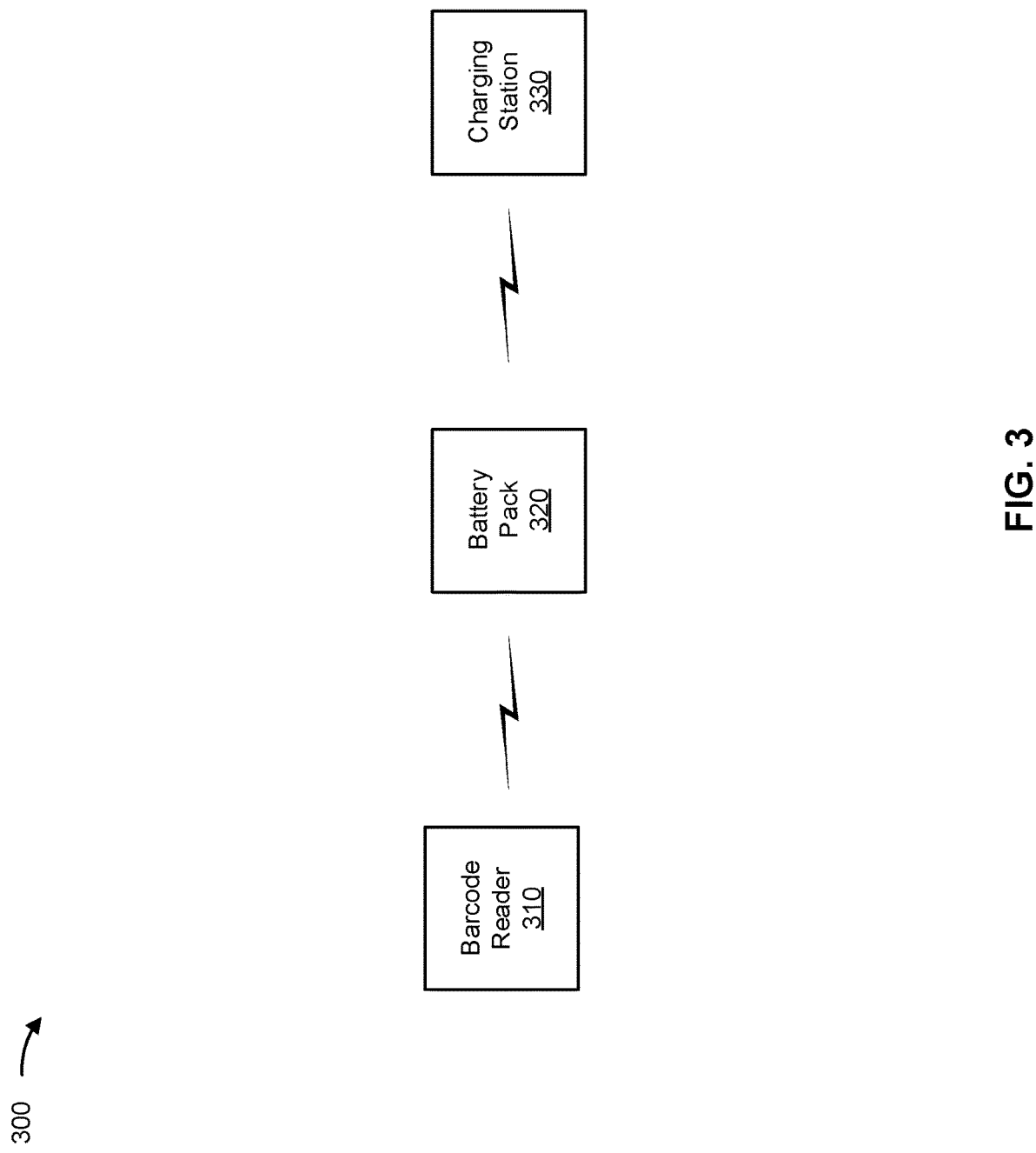
FIG. 3 is a diagram of an example system in which devices and/or methods described herein may be implemented.

FIG. 3 is a diagram of an example system 300 in which systems and/or methods described herein may be implemented. As shown in FIG. 3, system 300 may include a barcode reader 310, a battery pack 320, and a charging station 330. Devices of system 300 may interconnect via wired connections, wireless connections, or a combination of wired and wireless connections.

The barcode reader 310 includes one or more devices capable of receiving, generating, storing, processing, and/or providing data associated with a barcode, as described elsewhere herein. The barcode reader 310 may include an image capture device (e.g., a camera or scanner) that is configured to capture an image of a barcode and/or scan a barcode to permit the barcode to be decoded. Additionally, or alternatively, the barcode reader 310 may include a communication device and/or a computing device. For example, the barcode reader 310 may include a wireless communication device, a mobile device, a wearable communication device (e.g., a smart wristwatch, a pair of smart eyeglasses, a head mounted display, or a virtual reality headset), or a similar type of device.

The battery pack 320 includes one or more devices capable of receiving, generating, storing, processing, and/or providing information associated with a rechargeable power source. The battery pack 320 may include a computing device and/or a rechargeable power source (e.g., a battery). The battery pack 320 may be configured to power the barcode reader 310 and/or be recharged via the charging station 330.

The charging station 330 includes one or more devices capable of receiving, generating, storing, and/or supplying energy or power to a rechargeable power source, such as a battery of the battery pack 320. The charging station 330 may be configured to charge one or more rechargeable power sources and/or receive one or more battery packs 320, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of system 300 may perform one or more functions described as being performed by another set of devices of system 300.

Figure 4:
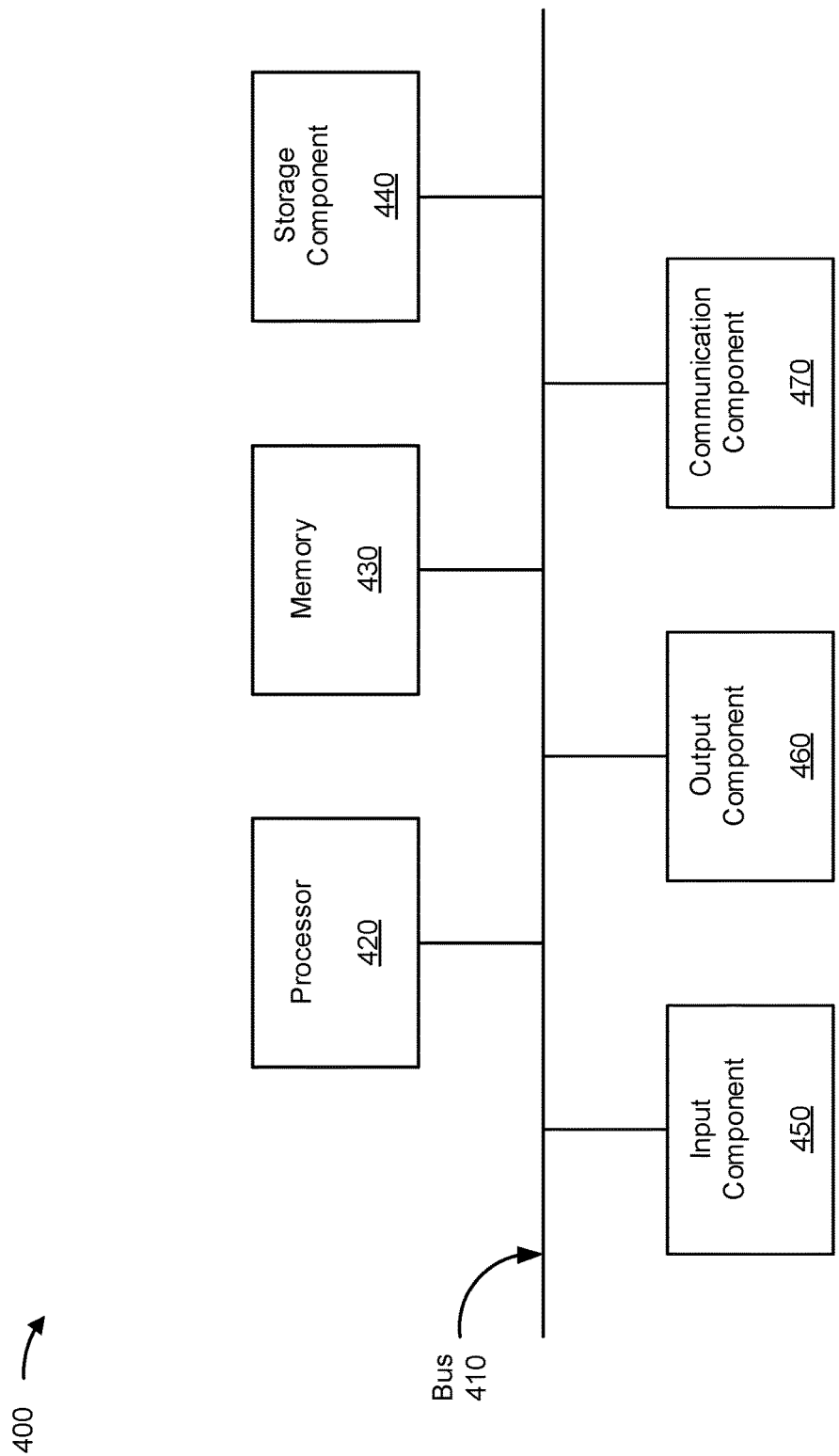
FIG. 4 is a diagram of example components of one or more devices of FIG. 3.

FIG. 4 is a diagram of example components of a device 400, which may correspond to the barcode reader 310, the battery pack 320, and/or the charging station 330. In some implementations, the barcode reader 310, the battery pack 320, and/or the charging station 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
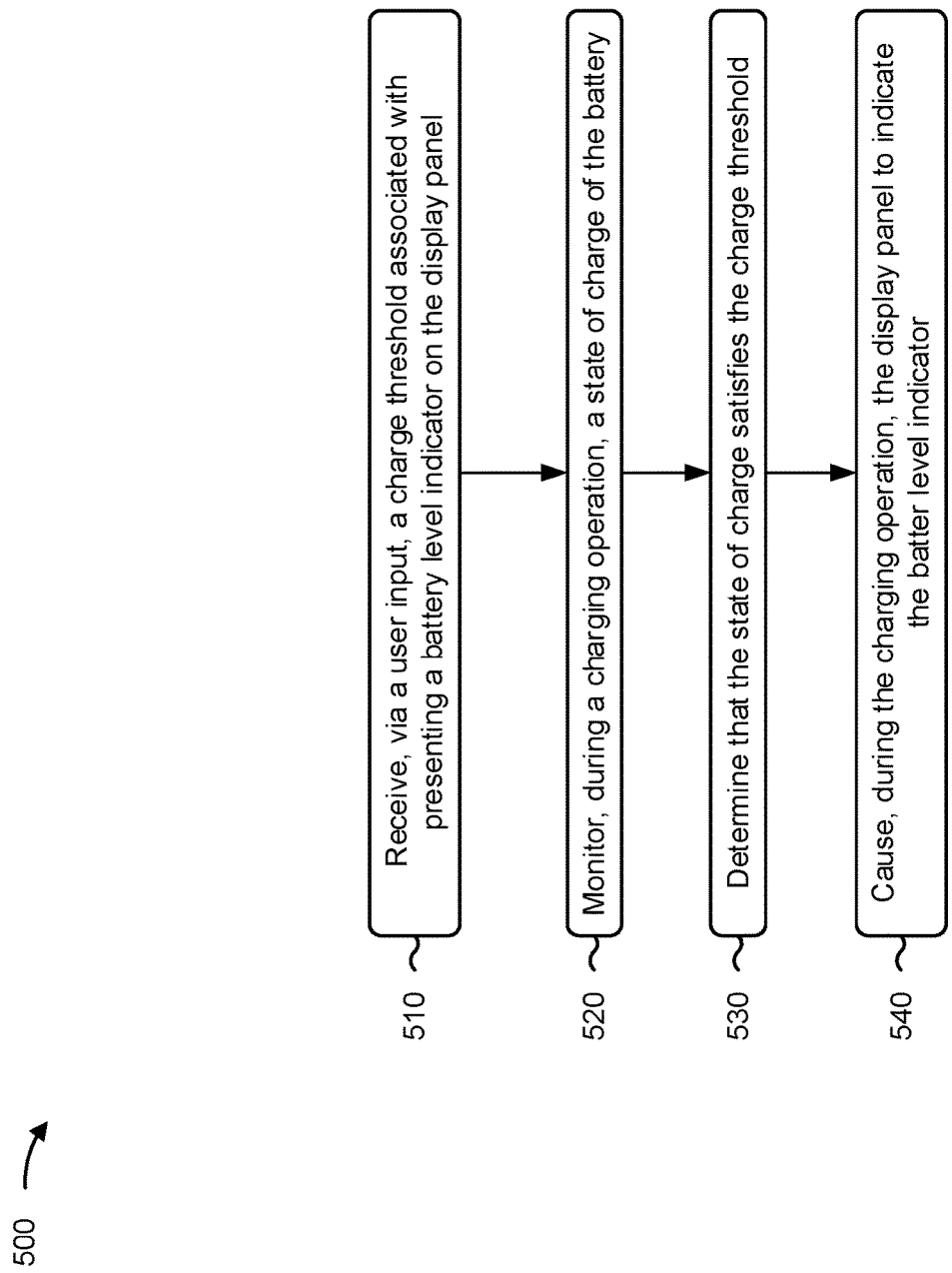
FIG. 5 is a flowchart of an example process relating to controlling a battery level indicator of a barcode reader.

FIG. 5 is a flowchart of an example process 500 associated with controlling a display panel of a barcode reader to indicate a battery level. In some implementations, one or more process blocks of FIG. 5 may be performed by a controller (e.g., the controller of the barcode reader 310). In some implementations, one or more process blocks of FIG. 5 may be performed by another device or a group of devices separate from or including the controller, such as a battery manager of a battery (e.g., the battery pack 320) or a controller of a charging station (e.g., the charging station 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, via a user input, a charge threshold associated with presenting a battery level indicator on the display panel (block 510). For example, the controller may receive, via a user input, a charge threshold associated with presenting a battery level indicator on the display panel, as described above. In some implementations, the charge threshold may be adjusted from a default threshold or a previous charge threshold that was selected via a previously received user input.

As further shown in FIG. 5, process 500 may include monitoring, during a charging operation, a state of charge of the battery (block 520). For example, the controller may monitor, during a charging operation, a state of charge of the battery, as described above. The charging operation may be detected based on receiving, from a battery interface associated with the battery, a measurement of the state of charge of the battery. The state of charge of the battery may be monitored based on receiving measurements of the state of charge from a battery interface associated with the battery.

As further shown in FIG. 5, process 500 may include determining that the state of charge satisfies the charge threshold (block 530). For example, the controller may determine that the state of charge satisfies the charge threshold, as described above.

As further shown in FIG. 5, process 500 may include causing, during the charging operation, the display panel to indicate the battery level indicator (block 540). For example, the controller may cause, during the charging operation, the display panel to indicate the battery level indicator, as described above. The battery level indicator may indicate that the state of charge satisfies the charge threshold.

The controller may cause the display panel to adjust a pixel location associated with the battery level indicator according to an adjustment schedule. The adjustment schedule may be configured to cause the battery level indicator to be indicated in a first location of the display panel during a first time period and to be indicated in a second location of the display panel during a second time period that begins after the first time period, wherein the first location is different from the second location.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for controlling a display panel of a barcode reader, comprising:
   receiving, by a controller and via a user input, a charge threshold associated with presenting a battery level indicator on the display panel;
   monitoring, by the controller and during a charging operation, a state of charge of the battery;
   determining, by the controller, that the state of charge satisfies the charge threshold; and
   causing, by the controller and during the charging operation, the display panel to indicate the battery level indicator.

2. The method of claim 1, wherein the charging operation is detected based on receiving, from a battery interface associated with the battery, a measurement of the state of charge of the battery.

3. The method of claim 1, wherein the state of charge of the battery is monitored based on receiving measurements of the state of charge from a battery interface associated with the battery.

4. The method of claim 1, wherein the battery level indicator indicates the state of charge via the display panel.

5. The method of claim 1, wherein the battery level indicator indicates that the state of charge satisfies the charge threshold.

6. The method of claim 1, wherein causing the display panel to indicate the battery level indicator comprises:
   causing the display panel to adjust a pixel location associated with the battery level indicator according to an adjustment schedule.

7. The method of claim 6, wherein the adjustment schedule is configured to cause the battery level indicator to be indicated in a first location of the display panel during a first time period and to be indicated in a second location of the display panel during a second time period that begins after the first time period,
   wherein the first location is different from the second location.

8. The method of claim 1, wherein the charge threshold is adjusted from a default threshold or a previous charge threshold that was selected via a previously received user input.

9. The method of claim 1, wherein the charge threshold is at least 50 percent of a maximum charge capacity of the battery.

10. A barcode reader, comprising:
    a display panel; and
    a controller configured to:
       receive, during a charging operation and from a battery interface of a battery, a measurement of a state of charge of the battery;
       determine that the measurement indicates that the state of charge satisfies a charge threshold,
          wherein the charge threshold was set according to a user input; and
       enable, during the charging operation and based on determining that the state of charge satisfies the charge threshold, the battery to supply power to the display panel; and
       cause the display panel to present a battery level indicator associated with the state of charge.

11. The barcode reader of claim 10, wherein, after the charge operation is detected, the display panel is prevented from indicating the state of charge during the charging operation, until the state of charge satisfies the charge threshold.

12. The barcode reader of claim 10, further comprising:
    a user input component,
       wherein the user input is received via the user input component.

13. The barcode reader of claim 10, wherein the charge threshold is one of a plurality of selectable charge thresholds that are selectable via corresponding user inputs.

14. The barcode reader of claim 13, wherein the charge threshold is a minimum of a charge capacity range of the battery, and
    wherein another one of the plurality of selectable charge thresholds is greater than or equal to a maximum of the charge capacity range of the battery.

15. The barcode reader of claim 10, wherein the controller is further configured to:
    move a pixel location of the battery level indicator on the display panel according to an adjustment schedule.

16. A system comprising:
    a battery pack;
    a charge station; and
    a barcode reader configured to:
       set a configurable charge threshold for presenting, during one or more charge operations, a battery level indicator, on a display panel of the barcode reader,
          wherein the battery level indicator is associated with a state of charge of a battery of the battery pack;
       detect a charging operation involving the battery and the charging station;
       determine, during the charging operation, that the state of charge satisfies the configurable charge threshold; and
       cause, based on the state of charge satisfying the configurable charge threshold, the display panel to present the battery level indicator.

17. The system of claim 16, wherein the battery is a replaceable battery that is configured to be received by the barcode reader.

18. The system of claim 16, wherein the battery level indicator indicates that the state of charge satisfies the configurable charge threshold or a value that is indicative of the state of charge.

19. The system of claim 16, wherein the charging operation is detected based on detecting that a terminal of the battery is in contact with the charging station.

20. The system of claim 19, wherein the barcode reader is further configured to:
- move, according to an adjustment schedule, a pixel location of the battery level indicator on the display panel until the charging operation has ended.

* * * * *